United States Patent
Burky et al.

(10) Patent No.: US 10,590,746 B2
(45) Date of Patent: Mar. 17, 2020

(54) FORCE-ACTIVATED THERMAL BATTERY FOR USE IN A WELLBORE

(71) Applicant: Halliburton Energy Services, Inc., Houston, TX (US)

(72) Inventors: Thomas Earl Burky, Mansfield, TX (US); Ozegbe James Chukwuma, Grand Prairie, TX (US); Thomas Jeffrey Wuensche, Granbury, TX (US)

(73) Assignee: Halliburton Energy Services, Inc., Houston, TX (US)

(*) Notice: Subject to any disclaimer, the term of this patent is extended or adjusted under 35 U.S.C. 154(b) by 170 days.

(21) Appl. No.: 15/570,921

(22) PCT Filed: Dec. 2, 2016

(86) PCT No.: PCT/US2016/064574
§ 371 (c)(1),
(2) Date: Oct. 31, 2017

(87) PCT Pub. No.: WO2018/101953
PCT Pub. Date: Jun. 7, 2018

(65) Prior Publication Data
US 2018/0363425 A1    Dec. 20, 2018

(51) Int. Cl.
*E21B 41/00* (2006.01)
*E21B 23/00* (2006.01)
*H01M 6/36* (2006.01)
*H01M 6/50* (2006.01)

(52) U.S. Cl.
CPC .......... *E21B 41/0085* (2013.01); *E21B 23/00* (2013.01); *E21B 41/0007* (2013.01); *H01M 6/36* (2013.01); *H01M 6/5038* (2013.01)

(58) Field of Classification Search
CPC .................................................. E21B 41/0085
USPC .......................................................... 166/381
See application file for complete search history.

(56) References Cited

U.S. PATENT DOCUMENTS

| | | | |
|---|---|---|---|
| 3,425,872 | A | 2/1969 | Levy et al. |
| 4,091,710 | A | 5/1978 | Lienau et al. |
| 4,416,000 | A | 11/1983 | Scherbatskoy et al. |
| 5,322,019 | A | 6/1994 | Hyland |
| 6,384,571 | B1 | 5/2002 | Velez et al. |
| 7,629,075 | B2 | 12/2009 | Miles et al. |
| 8,677,900 | B2 | 3/2014 | Rastegar et al. |
| 8,776,688 | B2 | 7/2014 | Rastegar et al. |
| 2003/0070812 | A1 | 4/2003 | Robertson |
| 2008/0245255 | A1* | 10/2008 | Barton .............. E21B 43/11857 102/313 |

(Continued)

OTHER PUBLICATIONS

International Patent Application No. PCT/US2016/064574, "International Search Report and Written Opinion", dated Aug. 16, 2017, 14 pages.

*Primary Examiner* — Taras P Bemko
(74) *Attorney, Agent, or Firm* — Kilpatrick Townsend & Stockton LLP (57) ABSTRACT

A thermal battery positioned in a wellbore can be force activated by a device. The device can include a body coupled to a thermal battery positioned in a wellbore. The body can include a piston retained at a first position in an inner area of the body. The piston can move from the first position to a second position in response to a force applied to the body. The thermal battery can be activated by moving the piston to the second position.

18 Claims, 5 Drawing Sheets

(56) References Cited

U.S. PATENT DOCUMENTS

| | | |
|---|---|---|
| 2010/0307773 A1 | 12/2010 | Tinnen et al. |
| 2012/0088134 A1 | 4/2012 | Wood et al. |
| 2013/0029241 A1 | 1/2013 | Mason et al. |
| 2013/0078528 A1 | 3/2013 | Swift et al. |
| 2015/0331008 A1* | 11/2015 | Rastegar .............. B01J 31/2265 102/216 |

\* cited by examiner

FORCE-ACTIVATED THERMAL BATTERY FOR USE IN A WELLBORE

TECHNICAL FIELD

The present disclosure relates generally to thermal batteries, and more particularly (although not necessarily exclusively), to a force-activated thermal battery for use in a wellbore.

BACKGROUND

A well, such as an oil or gas well for extracting hydrocarbon fluids from a subterranean formation, can include various tools positioned in a wellbore. In some wells, tools may remain downhole permanently or indefinitely to perform delayed operations in the wellbore. Temperatures naturally present in the wellbore can be high. The temperatures naturally present in the wellbore can significantly damage power supplies positioned downhole. For example, some batteries positioned in a wellbore can degrade over time due to the temperatures naturally present in the wellbore. Some batteries, such as some lithium batteries can catch fire at temperatures above 180° C. and present a safety concern. Some lithium batteries can be costly to ship in part due to their instability, which can limit the modes for transporting some lithium batteries. For example, some lithium batteries are not allowed to be transported by plane due to safety concerns. The conditions in some wellbores are so harsh that some tools cannot be used in the wellbore because existing batteries cannot be used in the wellbore to power the tools.

DETAILED DESCRIPTION

Certain aspects and features relate to using force to activate a thermal battery positioned in a wellbore. A thermal battery can be a battery that is activated, such that the battery provides electrical power, in response to being heated to a temperature that exceeds a threshold temperature. The thermal battery can operate in high temperatures that can be present in some wellbores and can provide power to a tool positioned in the wellbore. An activating device can be coupled to a thermal battery positioned in a wellbore, and can activate the thermal battery in response to a force that is applied to the activating device. In some aspects, the activating device can include a piston that moves in response to the force and can ignite pyrotechnics for heating the thermal battery to a temperature that exceeds the threshold temperature. In some examples, the piston can be retained in a first position by shear pins. The shear pins can shear in response to an amount of force exceeding a threshold value to allow the piston to move to a second position and to activate the thermal battery.

A thermal battery can include opposing electrodes (e.g., an anode and a cathode) that can be connected by a fluid electrolyte to produce electrical power as a result of an electrochemical reaction. The electrolyte in a thermal battery can be solid at room temperature, to prevent the electrochemical reaction from occurring. The electrolyte can melt at a high temperature (e.g., 150° C. to 300° C. or more) to allow the electrochemical reaction to occur. In some examples, thermal batteries can provide a longer shelf life, safer shipping, and safer storage than standard lithium batteries by not producing power below a high activation temperature.

A thermal battery can reliably operate at high temperatures that can degrade or destroy other batteries. In some examples, thermal batteries can be used to power any downhole electronic device, including but not limited to a logging tool, an electro-mechanical tool, an explosive firing system, or a data recording system. Thermal batteries can also be used with tubing conveyed equipment, slickline operations, or fully remote activation. Thermal batteries can also be used for operations with a long wait time (e.g., months) before activation. The use of thermal batteries can reduce the use of additional safety measures for locking power out (e.g., if the operation that is being performed is an explosive perforating operation).

In some aspects, the activation temperature can be achieved by igniting pyrotechnics (e.g., thermite) included in (or coupled to) a thermal battery. For example, a mechanical primer-initiated thermal battery can include a primer that ignites pyrotechnics in response to being contacted by a firing pin. An activating device can include a firing pin coupled to the piston, such that the firing pin can impact the primer of a thermal battery in response to the piston moving from a first position to a second position. The impact can ignite the pyrotechnic, heat the thermal battery above a threshold temperature, and activate the thermal battery. The piston can move to the second position in response to force being applied to the activating device. In some examples, the force can be caused by a pressure differential between an inner area of the activating device and an area (e.g., the wellbore) external to the activating device. The pressure differential can be created by a pump at a surface of the wellbore pumping a gas or a liquid into the wellbore to increase the pressure in the wellbore. In additional or alternative examples, the force can include an object (e.g., a drop bar) colliding with the piston. The drop bar can be released from a surface of the wellbore and travel through a tubing string coupled to the activating device.

In some aspects, pyrotechnics can be activated by an electrical squib. An electrical squib can produce a small flame for igniting pyrotechnics in response to an electrical signal. An electrical power source can introduce reliability problems in an oil and gas environment due to the harsh conditions of the wellbore. And, a live electrical power source (e.g., wireline from the surface) can introduce safety concerns when electrically initiated explosive systems are being used (e.g., for perforating operations). An activating device can generate a short-term electrical signal (e.g., an electrical pulse) in response to force applied on the activating device. For example, the activating device can include a magnet coupled to a piston that can move through a coil of conductive material in response to the force being applied to the piston. Moving the magnet through the coil can produce an electrical signal that can ignite the pyrotechnics. As described above, the force can include a pressure being applied to the activating device or an object colliding with the piston. Shear pins can retain the piston at a first position and respond to the force reaching a threshold amount by shearing to allow the piston to move to a second position and activate the thermal battery.

A force-activated thermal battery can be used in a wellbore to provide a reliable supply of electrical energy that is resistant to thermal damage and may avoid spurious ground paths and stray voltages that can be present in wireline systems having multiple electrical connections. The activating device can have a lower redress cost than existing mechanical firing devices by not containing detonation components. The activating device can have lower operational complexity than existing electronic firing devices, by not including sensors or a processing device.

In some aspects, a thermal battery can be activated in a wellbore without the use of pyrotechnics. The high temperatures that naturally occur in the wellbore can be used to activate the thermal battery. Once activated, the thermal battery can be used to power downhole electronic devices or systems. In the case of well perforating explosive firing systems, the activation of the battery by the downhole environment can provide an additional element of safety in that the system does not have any electrical power until a high temperature is reached. Also, the electrical power can be removed as the firing system is raised from the well during recovery when the battery self-deactivates due to the lower temperatures. A force-activated thermal battery can be positioned in a wellbore without an added risk of an electrical source.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
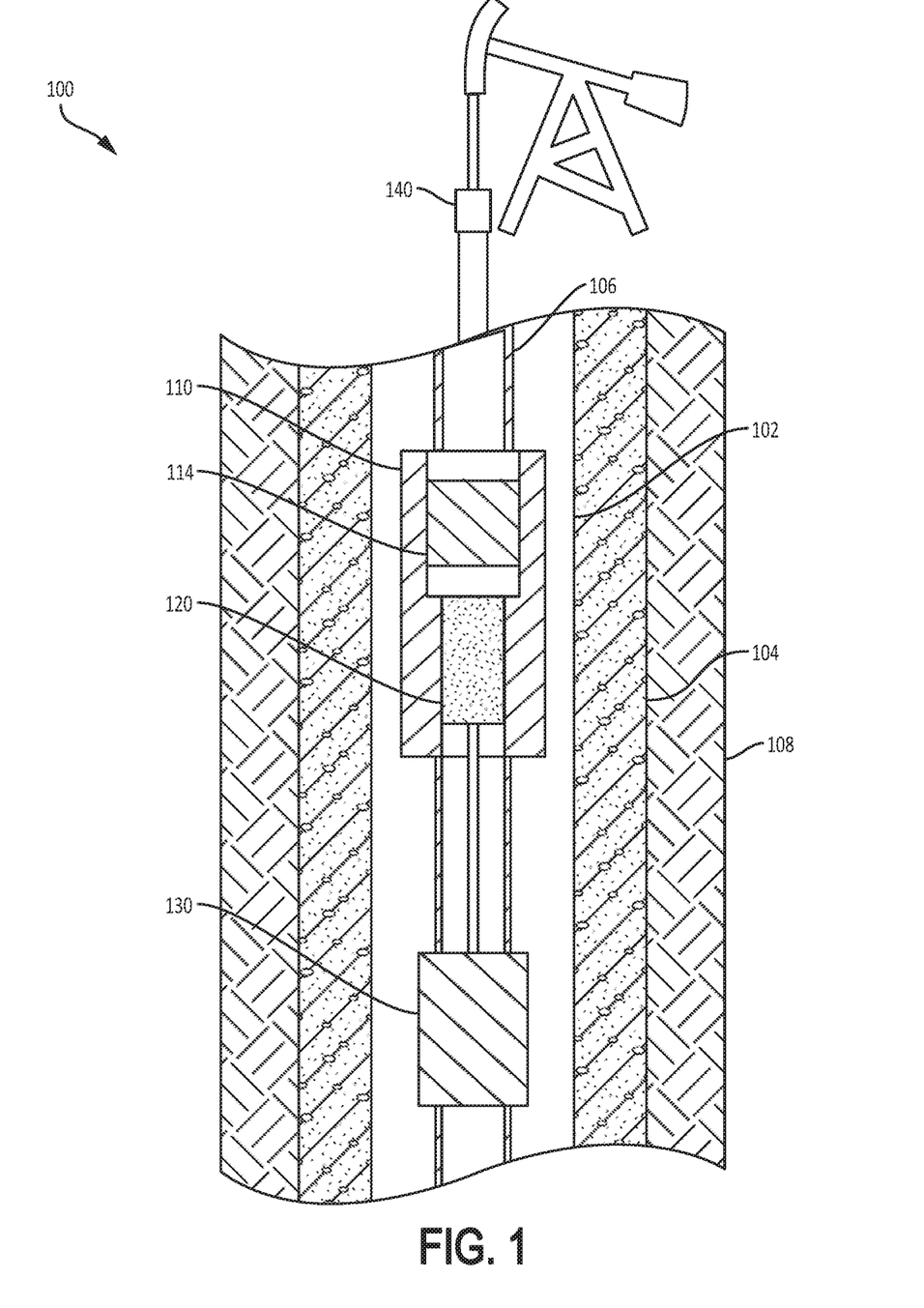
FIG. 1 is a cross-sectional diagram of an example of a well system having a thermal battery positioned in a wellbore that can be activated by a device in response to force being applied to the device according to one aspect of the present disclosure.

FIG. 1 is a cross-sectional diagram of a well system 100 including an activating device 110 coupled to a thermal battery 120 positioned in a wellbore 102. The thermal battery 120 can be communicatively coupled to a tool 130 positioned in the wellbore 102, such that the thermal battery 120 can be activated to provide power to the tool 130.

The wellbore 102 can extend from a surface of the earth through various earth strata, including a subterranean formation 108 from which hydrocarbons may be extracted using wellbore operations. The wellbore 102 can reach temperatures that exceed 180° C. and can degrade or damage some power supplies positioned downhole. A portion of the wellbore 102 can include a cement casing 104 providing support to the wellbore 102. A tubing string 106 can extend from the surface through a portion of the wellbore 102. In some aspects, the tubing string 106 may include segmented pipes and provide a conduit through which formation fluids, such as hydrocarbons produced from the subterranean formation 108, may travel in the wellbore 102 to the surface. A pump 140 can be communicatively coupled to the tubing string 106 at the surface for pumping a fluid or a gas into the wellbore 102 to increase a pressure in the wellbore 102. In some examples, the pump 140 can be coupled to a pipe that extends between the pump 140 and the activating device 110. The pump 140 can pump a fluid or gas into the pipe to apply a pressure directly to the activating device 110.

The activating device 110 can be tubular and a portion of the thermal battery 120 can be included in an inner area of the activating device 110. The activating device 110 can also include a piston 114 in the inner area. The piston 114 can respond to a force by moving within the inner area of the activating device 110. In some examples, the force can be an increase in pressure in the wellbore 102 caused by the pump 140 pumping a gas into the wellbore 102. In additional or alternative examples, the force can be caused by a drop bar impacting the piston 114. The thermal battery 120 can be heated in response to the piston 114 moving within the inner area of the activating device 110. An electrolyte in the thermal battery 120 can melt above a threshold temperature. Melting the electrolyte can activate the thermal battery 120 such that the thermal battery 120 can generate power that can be transmitted over a cable to power the tool 130.

The tool 130 can be coupled to the tubing string 106. In some aspects, the tool 130 can include any tool that can be used to perform operations in the wellbore 102. In some examples, the tool 130 can include a valve, a sensor, a data recorder, or an electrical detonator. The tool 130 can remain in the wellbore 102 for an extended time (e.g., a year or more) to perform a long-term or delayed operation.

In some aspects, the activating device 110 can be removed from wellbore 102 separate from the thermal battery 120, which can remain in the wellbore 102. A removal tool (e.g., a slickline) can be used to pull the activating device 110 from the wellbore 102. In some aspects, the thermal battery 120 can be coupled to the tool 130, and the activating device 110 may be positioned around the thermal battery 120 without coupling to the thermal battery 120. When the activating device 110 is removed from the wellbore 102, the thermal battery 120 can remain coupled to the tool 130 allowing the activating device 110 to be removed from the wellbore 102 separately from the thermal battery 120. In additional or alternative aspects, the thermal battery 120 may be retained in the inner area of the activating device 110 by additional shear pins. The additional shear pins can respond to the activating device 110 being removed from the wellbore 102 by shearing to allow the activating device 110 to be removed from the wellbore 102 separately from the thermal battery 120. The activating device 110 can be repositioned in a wellbore and coupled to another thermal battery for activating the other thermal battery.

Although FIG. 1 depicts a wellbore 102 having a single vertical bore, the activating device 110 can be used with a thermal battery positioned in a multilateral wellbore. In some aspects, a thermal battery can be positioned external to an activating device and communicatively coupled to the activating device for being activated. In additional or alternative aspects, a thermal battery can be included in (or directly coupled to) a tool for providing power to the tool. A thermal battery independent from an activating device can be communicatively coupled to the activating device by a cable, and the cable can decouple in response to the activating device being removed from the wellbore.

An activating device can be used to activate one or more thermal batteries positioned in a wellbore based on force applied to the activating device. The thermal batteries can each power one or more tools positioned downhole. In some examples, the thermal batteries can provide wireless power to a tool. In additional or alternative examples, more than one activating device can be positioned in a wellbore. In some aspects, an activating device can be positioned deeper in a wellbore than an associated thermal battery or a tool powered by the thermal battery.

Figure 2:
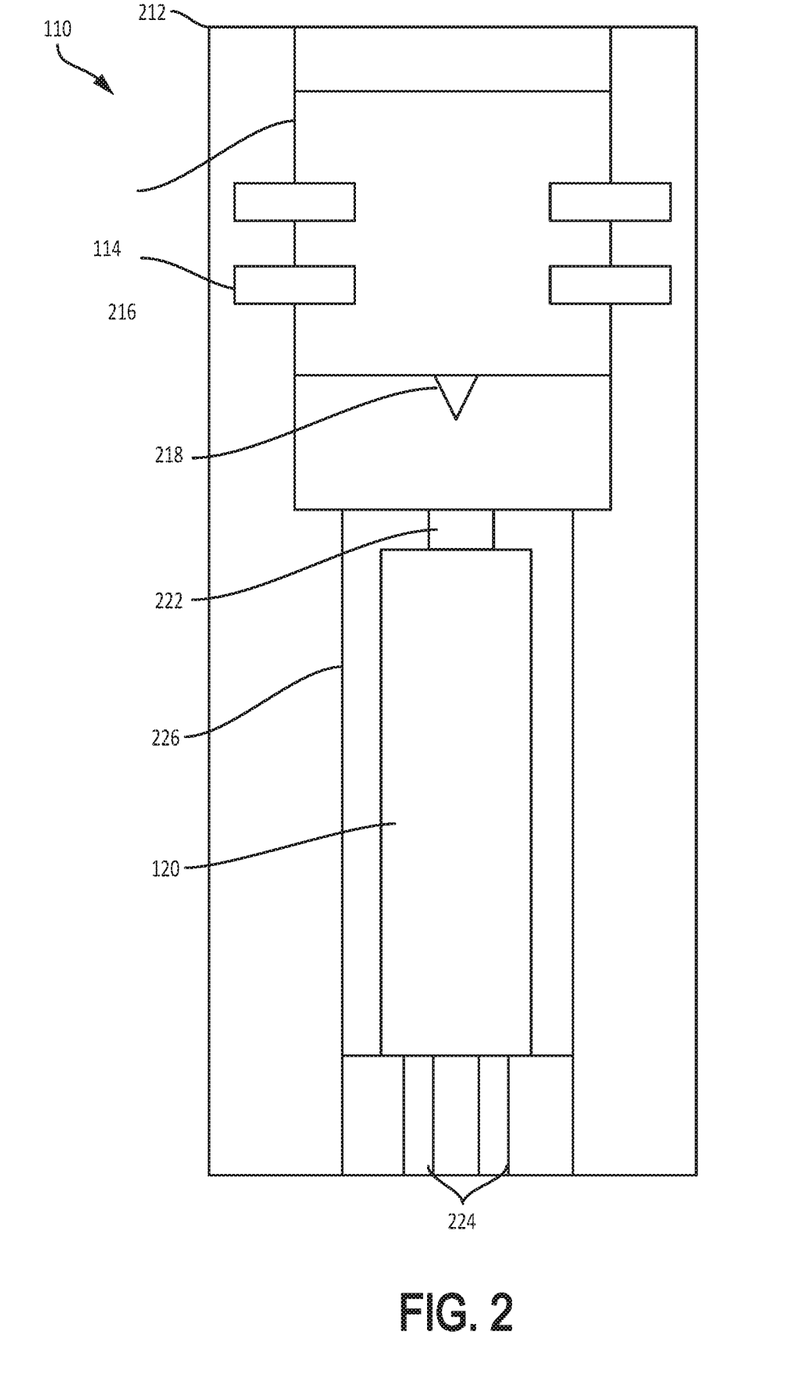
FIG. 2 is a schematic diagram of an example of a device for activating a thermal battery positioned in a wellbore using a firing pin to contact a primer in response to force applied to the device according to one aspect of the present disclosure.

FIG. 2 is a schematic diagram of an example of the activating device 110 in FIG. 1 including a firing pin 218 for igniting pyrotechnics 226 to heat the thermal battery 120. The activating device 110 can include a body 212 having an inner area with shear pins 216 for retaining the piston 114 at a first position.

The shear pins 216 can couple to an inner surface of the body 212 and an outer surface of the piston 114. The shear pins 216 can shear in response to a force above a certain threshold value being applied to the piston 114. The force can be caused by a pressure differential between the wellbore and the inner area of the body 212. The force can also be caused by a drop bar impacting the piston 114. The piston 114 can move to a second position in response to the shear pins 216 shearing. A firing pin 218 can be coupled to the piston 114 such that the firing pin 218 can contact a primer 222 in response to the piston 114 moving to the second position. In some aspects, the primer 222 can generate a flame in response to the firing pin 218 contacting the primer 222, and the flame can ignite the pyrotechnics 226. In additional or alternative aspects, the primer 222 can include a piezoelectric crystal that can generate an electrical signal in response to the firing pin 218 contacting the primer 222, and the electrical signal can ignite the pyrotechnics 226. The pyrotechnics 226 can burn such that a temperature of the thermal battery 120 exceeds a threshold temperature (e.g., a melting point of an electrolyte in the thermal battery 120).

The thermal battery 120 can activate in response to being heated above the threshold temperature. The thermal battery 120 can produce electrical energy that can be transmitted from the activating device 110 by electrical leads 224. In some examples, the electrical leads 224 can be communicatively coupled to a tool positioned downhole. For example, the thermal battery 120 can provide power to a valve, a sensor, a data recorder, an electrical detonator, or a combination thereof. In additional or alternative aspects, the electrical leads 224 can be communicatively coupled to a power-conditioning module to regulate an output of the thermal battery 120 based on the input requirements of the tool.

Although FIG. 2 depicts the pyrotechnics 226 as coupled to an exterior surface of the thermal battery 120, a thermal battery according to other examples can include pyrotechnics positioned in an inner area of the thermal battery. In some aspects, insulation (e.g., a polyurethane foam or fiberglass) can be coupled to the exterior surface of a thermal battery. The insulation can prevent the loss of heat from the thermal battery to the surrounding area and thereby extend a period of activation of the thermal battery. In additional or alternative aspects, the body 212 can include a detonation component for generating the force to be applied to the piston 114 to cause the piston 114 to move from a first position to a second position. The detonation component can be triggered by an electrical source or a force applied to the detonator.

Figure 3:
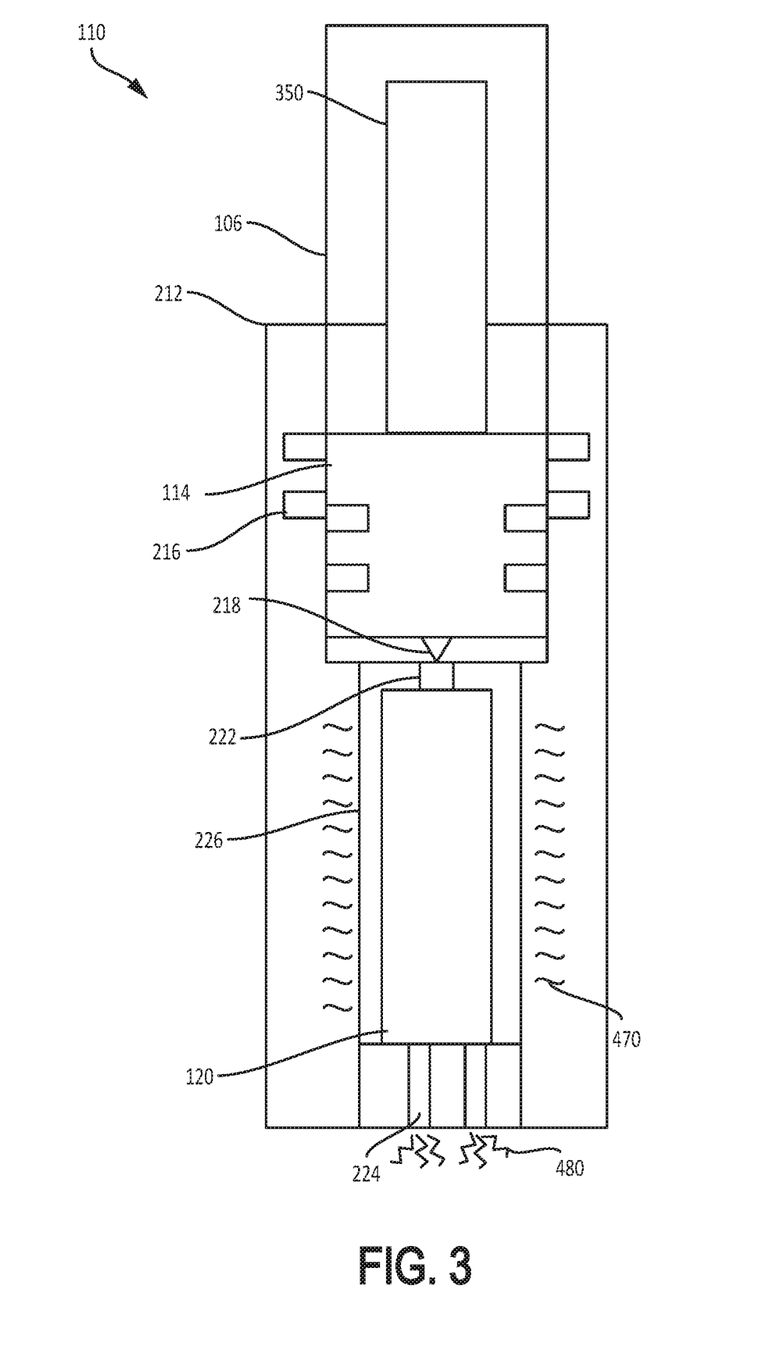
FIG. 3 is a schematic diagram of an example of a device activating a thermal battery positioned in a wellbore in response to a drop bar impacting the device according to one aspect of the present disclosure.

FIG. 3 is a schematic diagram of an example of the activating device 110 in FIG. 2 having activated the thermal battery 120 based in part on a drop bar 350 impacting the piston 114. The shear pins 216 are sheared and the piston 114 has moved to a second position in which firing pin 218 is in contact with primer 222. The impact of firing pin 218 with primer 222 may have ignited pyrotechnics 226, which are producing heat 470. In some examples, the primer 222 may have generated a flame to ignite the pyrotechnics 226. In additional or alternative examples, the primer 222 can have included a piezoelectric material that generated an electrical signal to ignite the pyrotechnics 226. As the thermal battery 120 is heated above a threshold temperature, the electrolyte in the thermal battery 120 melts and the thermal battery 120 can generate electrical energy 480 on electrical leads 224.

The drop bar 350 may have been released from a surface of the wellbore and traversed the tubing string 106 coupled to the body 212 of the activating device 110. In other examples, the drop bar 350 may have been released from a position in the wellbore in response to an electrical signal or a change in pressure. In some examples, the impact of the drop bar 350 with the piston 114 can have applied a force to shear the shear pins 216 such that the piston 114 can move to the second position. An additional force (e.g., a pressure in the wellbore) can have activated the activating device 110 by moving the piston 114 to the second position. In additional or alternative examples, the drop bar 350 can have applied a force to activate the activating device 110 by causing the shear pins 216 to shear and causing the piston 114 to move to the second position. In some aspects, the drop bar 350 can be removed from the tubing string 106 using a slickline or another removal tool.

Although FIG. 3 depicts the drop bar 350 in an inner area of the tubing string 106, a drop bar can be released into any tubing or segment of the wellbore above an activating device. In some examples, the force applied to an activating device to cause a set of shearing pins to shear and to activate the thermal battery can be caused by a pressure differential in the wellbore or a combination of a pressure differential and a drop bar. In additional or alternative aspects, a thermal battery can include an inner core of pyrotechnics to more provide a more efficient transfer of heat between the pyrotechnics and the thermal battery.

Figure 4:
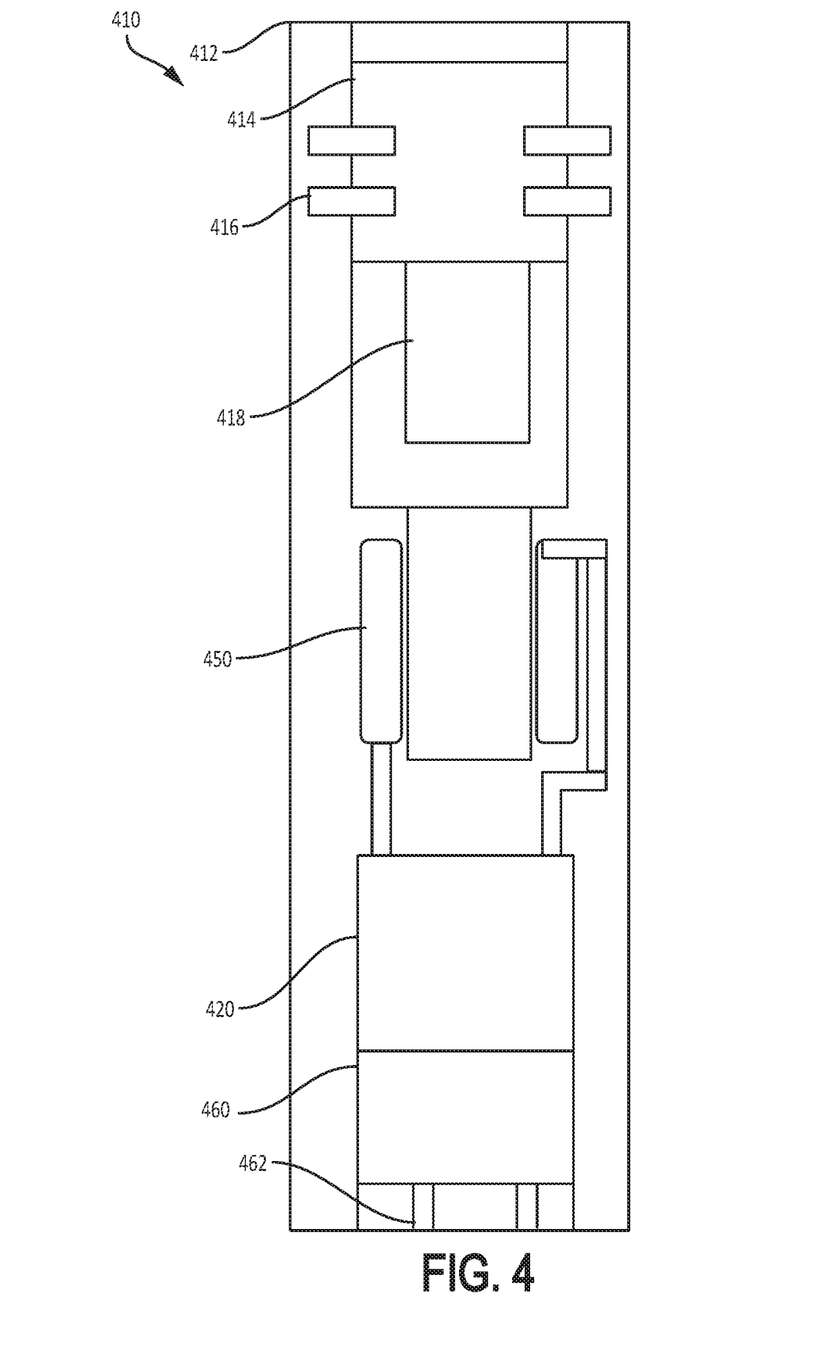
FIG. 4 is a schematic diagram of an example of a device for activating a thermal battery positioned in a wellbore using an electrical signal generated by passing a magnet through a conductive coil in response to force applied to the device according to one aspect of the present disclosure.

FIG. 4 is a schematic diagram of an example of an activating device 410 including a magnet 418 for generating an electrical signal that can be used to activate a thermal battery. The activating device 410 can include a body 412, a piston 414, shear pins 416, a magnet 418, a conductive coil 450, a thermal battery 420, a power-conditioning module 460, and electrical leads 462.

The piston 414 can be retained at a first position in an inner area of the body 412 by shear pins 416. The shear pins 416 can respond to a force applied to the piston 414 by shearing to allow the piston 414 to move to a second position in the inner area of the body 412. In some aspects, the force can include an increase in pressure in the area of the wellbore outside of the body 412. For example, a pump positioned at a surface of the wellbore can pump a gas into the wellbore to raise the pressure in the area of the wellbore outside of the body 412 such that a force is applied to the piston 414. In additional or alternative aspects, the force can include a drop bar impacting the piston 414. In some examples, the drop bar can be released from a surface of the wellbore and traverse a tubing string coupled to the body 412.

The conductive coil 450 can be made of any conductive material (e.g., copper). The conductive coil 450 can be included in the body 412 such that the magnet 418 moves through a portion of the conductive coil 450 as the piston 414 moves from the first position to the second position. In some examples, the magnet 418 can be exterior to the conductive coil 450 when the piston 414 is in the first position and the magnet 418 can be in an inner area of the conductive coil 450 when the piston 414 is in the second position. In additional or alternative examples, the magnet 418 can move from a position in the inner area of the conductive coil 450 to a position external to the conductive coil 450.

Moving the magnet 418 through an inner area of the conductive coil 450 can produce an electrical signal (e.g., an electrical pulse). The conductive coil 450 can be coupled to pyrotechnics included in (or coupled to) the thermal battery 420. The electrical signal can ignite the pyrotechnics and cause the thermal battery 420 to be heated above a threshold temperature. The electrolyte in the thermal battery 420 can melt and cause the thermal battery 420 to output electrical energy. In some aspects, insulation can be coupled to the exterior surface of a thermal battery (or included in the thermal battery). The insulation can prevent the loss of heat from the thermal battery to the surrounding area and thereby extend a period of electrical energy output.

The power-conditioning module 460 can be included in the inner area of the body 412 and can be communicatively coupled to an output of the thermal battery 420. The output of the thermal battery 420 can vary based on the amount of electrolyte in the thermal battery 420 that is in a liquid state. The power-conditioning module 460 can regulate the output of the thermal battery 420 and provide regulated power on the electrical leads 462 for powering a tool positioned in the wellbore.

Although FIG. 4 depicts the activating device 410 as including the thermal battery 420, a thermal battery can be positioned separately from the activating device 410. For example, a thermal battery can be included in a tool positioned downhole and a cable can run from the conductive coil 450 to the thermal battery. In some aspects, a conductive coil can wrap around an exterior surface of an activating device 410. In some aspects, a thermal battery and a power-conditioning module can be an independent component from an activating device or a tool.

A power-conditioning module can be used with any thermal battery including, for example, the thermal battery 120 in FIGS. 1-3. In some aspects, a power-conditioning module can be activated by any electrical pulse, including an electrical pulse from a surface linked wireline, an independent externally triggered circuit such as a monostable vibrator ("one-shot") or any other electrical supply. To increase the safety of the thermal battery, additional resistance or impedance may be placed in series or parallel with a cable communicatively coupling a conductive coil to a thermal battery. The additional resistance or impedance can increase the power level required to initiate a squib for igniting the pyrotechnics and activating the thermal battery.

Figure 5:
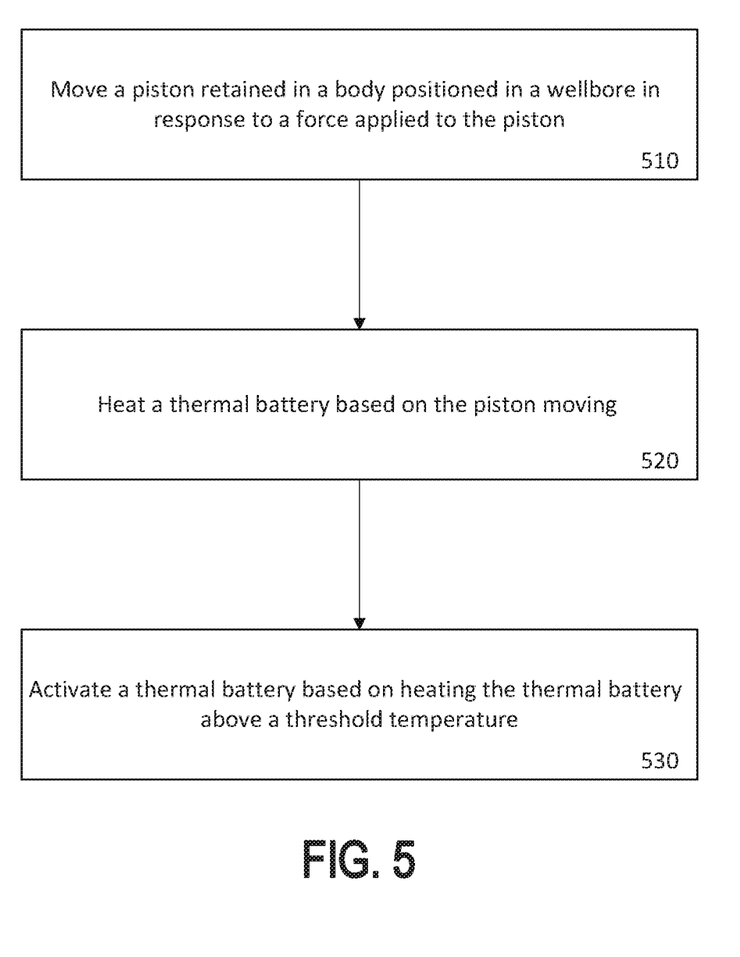
FIG. 5 is a flow chart of an example of a process for using force to activate a thermal battery positioned in a wellbore according to one aspect of the present disclosure.

FIG. 5 is a flow chart of an example of a process for using force to activate a thermal battery positioned in a wellbore. An activating device can be positioned in the wellbore and coupled to the thermal battery for powering a tool positioned in the wellbore. The temperatures in the wellbore can be over 180° C. limiting the use of existing batteries (e.g., lithium-thionyl chloride batteries and lithium-ion batteries). In some examples, the activating device can allow well operators to activate the thermal battery without using an electrical signal. In additional or alternative examples, the activating device can allow well operators to activate the thermal battery without sensors or a processing device being communicatively coupled to the activating device.

In block 510, a piston retained in a body positioned in a wellbore is moved in response to a force applied to the piston. The body can be part of the activating device and can include an inner area for housing the piston and the thermal battery. In other examples, the thermal battery can be an independent component or included in the tool. The piston can be retained at a first position in an inner area of the body by shear pins. The shear pins can respond to a threshold amount of force by shearing to allow the piston to move to a second position.

In some examples, the force applied to the shear pins can be caused by an increase in pressure in the wellbore. The increase in pressure in the wellbore can be caused by a pump at a surface of the wellbore pumping gas or liquid into the wellbore. In some examples, the body can be a tubular body and the piston can include a first surface that can be exposed to an area of the wellbore external to the body for responding to changes in the pressure of the wellbore. In additional or alternative examples, the pump can be coupled to a pipe that extends between the pump and the piston, such that the force on the piston is caused by an increase in pressure in the pipe. Using pressure to activate a thermal battery can increase safety and reduce costs by avoiding multiple electrical connections, stray electrical signals, detonation components, processing devices, and sensors that can be present in other activating systems.

In block 520, a thermal battery is heated based on the piston moving. In some aspects, the thermal battery can be heated based on the piston moving between the first position and the second position. For example, a magnet can be coupled to the piston, and the magnet can generate an electrical signal as the piston moves between the first position and the second position by passing through a conductive coil. The electrical signal can trigger an electrical squib to ignite pyrotechnics in the thermal battery. In additional or alternative aspects, the thermal battery can be heated based on the piston being positioned at the second position. For example, a firing pin can be coupled to the piston, and the firing pin can ignite pyrotechnics in the thermal battery by impacting a primer coupled to the thermal battery.

In block 530, the thermal battery is activated based on the thermal battery being heated to above a threshold temperature. The thermal battery can include opposing electrodes (e.g., an anode and a cathode) separated by an electrolyte. The electrolyte can be solid below the threshold temperature and prevent an electrochemical reaction in the thermal battery. Heating the thermal battery above the threshold temperature can melt the electrolyte and initiate the electrochemical reaction. In some aspects, the threshold temperature can be designed to be above the temperatures naturally present in a wellbore. For example, a thermal battery can include an electrolyte with a melting point of above 200° C. The pyrotechnics can burn and heat the thermal battery to above the melting point of the electrolyte such that the thermal battery is activated.

An activated thermal battery can produce power for powering a tool in the wellbore. In some aspects, the thermal battery can be communicatively coupled to a power-conditioning module to regulate an output of the thermal battery based on input restraints of the tool. The thermal battery can reliably operate at the high temperatures that are naturally present in the wellbore. In some aspects, the activating device can be removed from the wellbore separate from the thermal battery. The activating device can be coupled to another thermal battery in the wellbore and used to activate the other thermal battery in response to another force being applied to the piston.

In some aspects, the thermal battery can include an electrolyte with a melting point that is lower than a temperature naturally present in a wellbore. For example, a thermal battery can include an electrolyte with a melting point of 125° C. The thermal battery can be heated to above the threshold temperature by lowering the thermal battery into the wellbore. The thermal battery can cool as it is raised to the surface, which can solidify the electrolyte and deactivate the thermal battery.

In some aspects, a force-activated thermal battery for use in a wellbore is provided according to one or more of the following examples:

EXAMPLE #1

A device can include a body coupled to a thermal battery and positioned in a wellbore. The body can include a piston retained at a first position in an inner area of the body. The piston can be moved from the first position to a second position in response to a force applied to the body. The piston can also activate the thermal battery by moving to the second position.

EXAMPLE #2

The device of Example #1, can feature the body further including shear pins for retaining the piston at the first position. The shear pins can shear in response to the force exceeding a threshold value to allow the piston to move to the second position.

EXAMPLE #3

The device of Example #2, can feature the body further including a firing pin coupled to a surface of the piston. The firing pin can contact a primer as the piston moves to the second position to ignite pyrotechnics and activate the thermal battery.

EXAMPLE #4

The device of Example #3, can feature the body further including a primer having a piezoelectric material than can respond to contact with the firing pin by generating an electrical signal to ignite the pyrotechnics.

EXAMPLE #5

The device of Example #2, can feature the body further including a magnet coupled to a surface of the piston. The magnet can generate an electrical signal by passing through a coil as the piston moves to the second position. The electrical signal can be transmitted for igniting pyrotechnics to activate the thermal battery.

EXAMPLE #6

The device of Example #1, can feature the force can be a change in a pressure in the wellbore caused by a pump at a surface of the wellbore.

EXAMPLE #7

The device of Example #1, can feature the body can be coupled to a tubular string and the force can be caused in part by a drop bar moving through the tubular string.

EXAMPLE #8

The device of Example #1, can feature the thermal battery can be a first thermal battery. The body can further include an electrical power-conditioning module communicatively coupled between the first thermal battery and a tool powered by electrical power from the first thermal battery. The electrical power-conditioning module can regulate an output of the first thermal battery. The body can be removed from the wellbore separate from the first thermal battery and reused with a second thermal battery.

EXAMPLE #9

A system can include a tool, a thermal battery, and a body. The tool can be positioned in the wellbore. The thermal battery can be positioned in the wellbore and communicatively coupled to the tool for providing power to the tool in response to being heated above a threshold temperature. The body can be positioned in the wellbore and can be coupled to the thermal battery for responding to a force by heating the thermal battery above the threshold temperature.

EXAMPLE #10

The system of Example #9, can feature the body including a piston retained at a first position in an inner area of the body by shear pins. The shear pins can shear in response to the force exceeding a threshold value to allow the piston to move to a second position.

EXAMPLE #11

The system of Example #10, can feature the body further including a firing pin coupled to a surface of the piston for contacting a primer in response to the piston moving to the second position. The firing pin contacting the primer can ignite pyrotechnics for heating the thermal battery to a temperature above the threshold temperature.

EXAMPLE #12

The system of Example #10, can feature the body further including a magnet coupled to a surface of the piston for generating an electrical signal by passing through a coil in response to the piston moving to the second position. The electrical signal can be transmitted for igniting pyrotechnics to heat the thermal battery to a temperature above the threshold temperature.

EXAMPLE #13

The system of Example #10, can further include a pump positioned at a surface of the wellbore for generating the force by changing a pressure in the wellbore.

EXAMPLE #14

The system of Example #10, can further include a tubular string coupled to the body. The force can be partially generated by a drop bar traversing the tubular string.

EXAMPLE #15

The system of Example #9, can further include an electrical power-conditioning module communicatively coupled between the thermal battery and the tool for regulating an output of the thermal battery.

EXAMPLE #16

The system of Example #9, can feature the thermal battery can be a first thermal battery. The body can be removed from the wellbore separate from the first thermal battery and reused with a second thermal battery.

EXAMPLE #17

A method can include moving a piston retained in a body positioned in a wellbore from a first position in an inner area of the body to a second position in the inner area of the body in response to a force being applied to the piston. The method can further include heating a thermal battery positioned in the wellbore based on the piston moving to the second position. The method can further include activating the thermal battery coupled to the body based on heating the thermal battery above a threshold temperature.

EXAMPLE #18

The method of Example #17, can feature moving the piston including shearing a shear pin retaining the piston at the first position in response to the force exceeding a threshold value. Moving the piston can further include igniting pyrotechnics coupled to the thermal battery by contacting a primer with a firing pin as a result of the piston moving to the second position.

EXAMPLE #19

The method of Example #17, can feature moving the piston including shearing a shear pin retaining the piston at the first position in response to the force exceeding a threshold value. Moving the piston can further include generating an electrical signal by moving a magnet coupled to the piston through a coil coupled to the body as a result of the piston moving to the second position. Moving the piston can further include igniting pyrotechnics coupled to the thermal battery using the electrical signal.

EXAMPLE #20

The method of Example #17, can feature the thermal battery being a first thermal battery and the force being a first force. The method can further include generating the first force by using a pump positioned at a surface of the wellbore to change a pressure in the wellbore. The method can further include powering a first tool in the wellbore with the first thermal battery. The method can further include removing the body from the wellbore separate from the first thermal battery. The method can further include positioning the body in the wellbore to activate a second thermal battery in response to a second force being applied to the piston.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A device comprising:
a body coupleable to a thermal battery and positionable in a wellbore, the body comprising a piston retained at a first position in an inner area of the body, the piston being moveable from the first position to a second position in response to a force applied to the body and for activating the thermal battery by moving to the second position, wherein the thermal battery is a first thermal battery, and wherein the body is removable from the wellbore separate from the first thermal battery and reusable with a second thermal battery.

2. The device of claim 1, wherein the body further comprises shear pins for retaining the piston at the first position and for shearing in response to the force exceeding a threshold value to allow the piston to move to the second position.

3. The device of claim 2, wherein the body further comprises a firing pin coupled to a surface of the piston for contacting a primer as the piston moves to the second position to ignite pyrotechnics that activate the thermal battery in response to contact with the firing pin.

4. The device of claim 3, wherein the body further comprises a primer having a piezoelectric material for responding to contact with the firing pin by generating an electrical signal to ignite the pyrotechnics.

5. The device of claim 2, wherein the body further comprises a magnet coupled to a surface of the piston for generating an electrical signal by passing through a coil as the piston moves to the second position, the electrical signal being transmittable for igniting pyrotechnics to activate the thermal battery.

6. The device of claim 1, wherein the force is a change in a pressure in the wellbore caused by a pump at a surface of the wellbore.

7. The device of claim 1, wherein the body is coupleable to a tubular string and the force is caused at least in part by a drop bar moving through the tubular string.

8. The device of claim 1, wherein the body further comprises an electrical power-conditioning module communicatively coupleable between the first thermal battery and a tool powered by electrical power from the first thermal battery for regulating an output of the first thermal battery.

9. A system comprising:
a tool positionable in a wellbore;
a thermal battery positionable in the wellbore and communicatively coupleable to the tool for providing power to the tool in response to being heated above a threshold temperature; and
a body positionable in the wellbore and coupleable to the thermal battery for responding to a force by heating the thermal battery above the threshold temperature, and wherein the thermal battery is a first thermal battery, and wherein the body is removable from the wellbore separate from the first thermal battery and reusable with a second thermal battery.

10. The system of claim 9, wherein the body comprises a piston retained at a first position in an inner area of the body by shear pins, the shear pins for shearing in response to the force exceeding a threshold value to allow the piston to move to a second position.

11. The system of claim 10, wherein the body further comprises a firing pin coupled to a surface of the piston for contacting a primer in response to the piston moving to the second position to ignite pyrotechnics for heating the thermal battery to a temperature above the threshold temperature.

12. The system of claim 10, wherein the body further comprises a magnet coupled to a surface of the piston for generating an electrical signal by passing through a coil in response to the piston moving to the second position, the electrical signal being transmittable for igniting pyrotechnics to heat the thermal battery to a temperature above the threshold temperature.

13. The system of claim 10, further comprising a pump positionable at a surface of the wellbore for generating the force by changing a pressure in the wellbore.

14. The system of claim 10, further comprising a tubular string coupleable to the body, wherein the force is at least partially generatable by a drop bar traversing the tubular string.

15. The system of claim 9, further comprising an electrical power-conditioning module communicatively coupleable between the thermal battery and the tool for regulating an output of the thermal battery.

16. A method comprising:
- moving a piston retained in a body positioned in a wellbore from a first position in an inner area of the body to a second position in the inner area of the body in response to a force being applied to the piston;
- generating an electrical signal by moving a magnet coupled to the piston through a coil coupled to the body as a result of the piston moving to the second position;
- igniting pyrotechnics coupled to a thermal battery using the electrical signal;
- heating a thermal battery positioned in the wellbore with the pyrotechnics based on the piston moving to the second position; and
- activating the thermal battery coupled to the body based on heating the thermal battery above a threshold temperature.

17. The method of claim 16, wherein moving the piston comprises:
- shearing a shear pin retaining the piston at the first position in response to the force exceeding a threshold value.

18. The method of claim 16, wherein the thermal battery is a first thermal battery and the force is a first force, the method further comprising:
- generating the first force by using a pump positioned at a surface of the wellbore to change a pressure in the wellbore;
- powering a first tool in the wellbore with the first thermal battery;
- removing the body from the wellbore separate from the first thermal battery; and
- positioning the body in the wellbore to activate a second thermal battery in response to a second force being applied to the piston.

* * * * *